(12) United States Patent
Yaita et al.

(10) Patent No.: US 8,798,225 B2
(45) Date of Patent: Aug. 5, 2014

(54) RADIATION EXPOSURE REDUCTION METHOD

(75) Inventors: Yumi Yaita, Ota-ku (JP); Seiji Yamamoto, Setagaya-ku (JP); Hajime Hirasawa, Yokohama (JP); Yutaka Uruma, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 592 days.

(21) Appl. No.: 13/127,503

(22) PCT Filed: Nov. 4, 2009

(86) PCT No.: PCT/JP2009/068792
§ 371 (c)(1),
(2), (4) Date: May 4, 2011

(87) PCT Pub. No.: WO2010/053079
PCT Pub. Date: May 14, 2010

(65) Prior Publication Data
US 2011/0211663 A1    Sep. 1, 2011

(30) Foreign Application Priority Data
Nov. 4, 2008    (JP) .................................. 2008-283517

(51) Int. Cl.
*G21C 19/30*    (2006.01)
*G21C 7/06*    (2006.01)
*G21C 19/00*    (2006.01)
*G21C 7/00*    (2006.01)

(52) U.S. Cl.
USPC ........... 376/306; 376/207; 376/210; 376/211; 376/277; 376/305; 376/308; 376/310

(58) Field of Classification Search
CPC .......... G21C 5/12; G21C 5/123; G21C 5/126; G21C 7/06; G21C 7/24; G21C 7/32; G21C 11/02; G21C 15/24; G21C 15/243; G21C 15/247; G21C 15/28; G21C 19/28; G21C 19/30; G21C 19/32
USPC ......... 376/277, 305, 306, 308, 310–316, 347, 376/361, 207, 210, 211
See application file for complete search history.

(56) References Cited

U.S. PATENT DOCUMENTS 4,476,047 A * 10/1984 Bonnici et al. ................. 376/313
4,764,338 A * 8/1988 Uchida et al. ................. 376/313

(Continued)

FOREIGN PATENT DOCUMENTS

JP    5 215893    8/1993
JP    5 288893    11/1993

(Continued)

OTHER PUBLICATIONS

International Preliminary Report on Patentability and Written Opinion issued Jun. 7, 2011, in PCT/JP2009/068792.

(Continued)

*Primary Examiner* — Bernarr Gregory
(74) *Attorney, Agent, or Firm* — Oblon, Spivak, McClelland, Maier & Neustadt, L.L.P.

(57) ABSTRACT

A radiation exposure reduction method includes the steps of: injecting iron into a coolant which flows from the reactor cooling system to the reactor core in a nuclear power plant; and ferritizing and fixing radionuclides or parent nuclides thereof, which are contained in the coolant, on the surface of a reactor core structure, wherein an iron citrate which is soluble organic iron, or iron oxalate or iron fumarate which has a particle diameter of 3 μm or less, is used as the iron to be injected into the coolant.

6 Claims, 4 Drawing Sheets

(56) References Cited

U.S. PATENT DOCUMENTS

| | | | |
|---|---|---|---|
| 4,894,202 A * | 1/1990 | Nagase et al. | 376/306 |
| 5,015,436 A * | 5/1991 | Nagase et al. | 376/306 |
| 5,024,805 A * | 6/1991 | Murray | 376/305 |
| 5,245,642 A | 9/1993 | Lin | |
| 5,375,152 A * | 12/1994 | Lin | 376/310 |
| 5,398,269 A * | 3/1995 | Nagase et al. | 376/306 |
| 5,608,766 A * | 3/1997 | Andresen et al. | 376/305 |
| 5,715,290 A * | 2/1998 | Uetake et al. | 376/306 |
| 5,768,330 A * | 6/1998 | Andresen et al. | 376/305 |
| 7,844,024 B2 * | 11/2010 | Hosokawa et al. | 376/305 |
| 7,889,828 B2 * | 2/2011 | Hosokawa et al. | 376/305 |
| 8,457,270 B2 * | 6/2013 | Hosokawa et al. | 376/310 |

FOREIGN PATENT DOCUMENTS

| | | |
|---|---|---|
| JP | 7 20277 | 1/1995 |
| JP | 2000 9889 | 1/2000 |
| JP | 2002 131473 | 5/2002 |
| JP | 2007 182604 | 7/2007 |
| JP | 2007 192672 | 8/2007 |
| JP | 2009 264973 | 11/2009 |

OTHER PUBLICATIONS

International Search Report Issued Feb. 9, 2010 in PCT/JP09/068792 filed Nov. 4, 2009.

* cited by examiner

| | ABUNDANCE RATIO OF IRON (%) | | |
|---|---|---|---|
| | IRON HYDROXIDE OXIDE | NICKEL FERRITE | HEMATITE |
| BEFORE REACTION TEST | 100 | 0 | 0 |
| REACTION TEST RESULT 1 | 37 | 30 | 34 |
| REACTION TEST RESULT 2 | 14 | 52 | 34 |

RADIATION EXPOSURE REDUCTION METHOD

TECHNICAL FIELD

The present invention relates to a radiation exposure reduction method reducing the exposure doses received by the worker when the worker performs the plant inspection and so on by suppressing the radiation dose around a reactor cooling system in the nuclear power plant, particularly to a radiation exposure reduction technique for suppressing the radiation dose around a reactor cooling system by injecting iron into a coolant from the reactor cooling system and ferritizing and fixing radionuclides or parent nuclides thereof, which are contained in the coolant, on the surface of a reactor core structure.

BACKGROUND ART

In a nuclear power plant, metal materials such as stainless steel, nickel based alloy or the like are used as structure materials such as a reactor, reactor cooling system or the like. Some elements included in the metal materials become radionuclide by receiving neutrons generated and irradiated from the reactor core. For example, cobalt 58 ($^{58}$Co) as a radionuclide is generated from nickel 58 ($^{58}$Ni) by a nuclear reaction shown in equation (1) and cobalt 60 ($^{60}$Co) as a radionuclide is generated from cobalt 59 ($^{59}$Co) by a nuclear reaction shown in equation (2).

$$^{58}\text{Ni}(n,p)^{58}\text{Co} \qquad (1)$$

$$^{59}\text{Co}(n,\gamma)^{60}\text{Co} \qquad (2)$$

Radio nuclides produced in the reactor core move with the flow of the coolant (water) and then adhere to devices or pipes comprised in the reactor cooling system. The radionuclides adhered to the devices or pipes of the reactor cooling system, in particular, the cobalt 58 or cobalt 60 which irradiates high energy gamma-ray become main radiation source of the radial ray (radiation) received by the worker when the worker performs the plant inspection and so on.

It is important for reducing the exposure dose received by the worker to reduce a concentration of cobalt (Co) which is a coolant flowing in the reactor cooling system or nickel (Ni) which is a parent nuclides thereof. It is effective for reducing nickel concentration or cobalt concentration of the coolant that a method for injecting iron into a coolant and ferritizing and fixing nickel or cobalt, which are contained in the coolant, on the surface of a fuel cladding tube. The reason mentioned above is that the surface of the fuel cladding tube has overwhelmingly large surface area and the ferritization of nickel or cobalt easily proceeds on the surface of the fuel cladding tube by the operation of the boiling and condensation.

For example, radiation exposure reduction techniques proposed as conventional radiation exposure reduction technique are disclosed in following patent documents 1-4.

(1) Japanese Published Unexamined Patent Application (Patent Laid-Open) No. 2000-9889 (JP-A-2000-9889) as patent document 1 disclose the technique for suppressing the radiation dose around a reactor cooling system by injecting iron into a coolant and ferritizing and fixing nickel (Ni) or cobalt (Co), which are contained in the coolant, on the surface of a fuel cladding tube.

(2) Japanese Published Unexamined Patent Application (Patent Laid-Open) No. 5-288893 (JP-A-5-288893) as patent document 2 disclose the technique for suppressing the radiation dose around a reactor cooling system by injecting iron oxide obtained from iron ion into a coolant and ferritizing and fixing Ni or Co, which are contained in the coolant, on the surface of a fuel cladding tube.

(3) Japanese Published Unexamined Patent Application (Patent Laid-Open) No. 7-20277 (JP-A-7-20277) as patent document 3 disclose the technique for suppressing the radiation dose around a reactor cooling system by injecting iron oxide into a coolant and ferritizing and fixing Ni or Co, which are contained in the coolant, on the surface of a fuel cladding tube.

(4) Japanese Published Unexamined Patent Application (Patent Laid-Open) No. 63-229394 (JP-A-63-229394) as patent document 4 disclose the technique for suppressing the radiation dose around a reactor cooling system by reinjecting a metal oxide (crud:chalk river unclassified deposit) filtered at the condensate filter of the reactor cooling system into a reactor core and ferritizing and fixing Ni or Co, which are contained in the coolant, on the surface of a fuel cladding tube.

According to the patent document 1, it is known that iron ions are obtained by the electrolysis operation. The generation speed of the iron ions continuously varies in accordance with a state of a voltage between the electrodes or the surface of the electrodes. Therefore, it is not easy to feed iron to the coolant of the reactor cooling system with uniform flow and difficult to control iron concentration in the coolant. Further, as the electrolysis operation needs mechanical cleaning in order to remove oxide film generated on the surface of the electrodes and so on, a workload for handling the devices used upon the electrolysis operation is heavy.

Meanwhile, as iron oxide has lower reactivity in comparison to iron ion, a good ferritization of the iron oxide can not be expected in comparison to Ni or Co even if the iron oxide injected into the coolant reached at the reactor core. Incidentally, it is not preferable situation for plant operation such that a concentration of iron in the coolant is too high.

OBJECTS OF THE INVENTION

In consideration of above circumstance, an object of the present inventions is to provide a radiation exposure reduction method capable of well ferritizing nickel and cobalt and then fixing nickel and cobalt well ferritized on the surface of the fuel cladding tube by injecting iron into the coolant, easily controlling the iron concentration in the coolant, and reducing the workload for handling the device used upon injecting the iron into the coolant.

The above mentioned objects can be achieved according to one aspect of the present inventions, there is provided a radiation exposure reduction method comprising the steps of:

injecting iron into a coolant which flows from the reactor cooling system to the reactor core in a nuclear power plant; and ferritizing and fixing radionuclides or parent nuclides thereof, which are contained in the coolant, on the surface of a reactor core structure, wherein an iron citrate which is soluble organic iron is used as the iron to be injected into the coolant.

Further, another aspect of the present invention, there is provided a radiation exposure reduction method comprising the steps of:

injecting iron into a coolant which flows from the reactor cooling system to the reactor core in a nuclear power plant; and ferritizing and fixing radionuclides or parent nuclides thereof, which are contained in the coolant, on the surface of a reactor core structure, wherein an iron oxalate or an iron fumarate which has a particle diameter of 3 μm or less, is used as the iron to be injected into the coolant.

In the example of the present invention, a soluble organic iron may be used with an infusible iron composite. Moreover, it is preferable that an iron oxyhydroxide is used as the infusible iron compounds.

According to the present invention including the feature described above, by injecting iron into the coolant, nickel and cobalt can be well ferritized and then fixed on the surface of the fuel cladding tube, the iron concentration in the coolant can be easily controlled, and the workload for handling the device used upon injecting iron into the coolant can be reduced.

Figure 1:
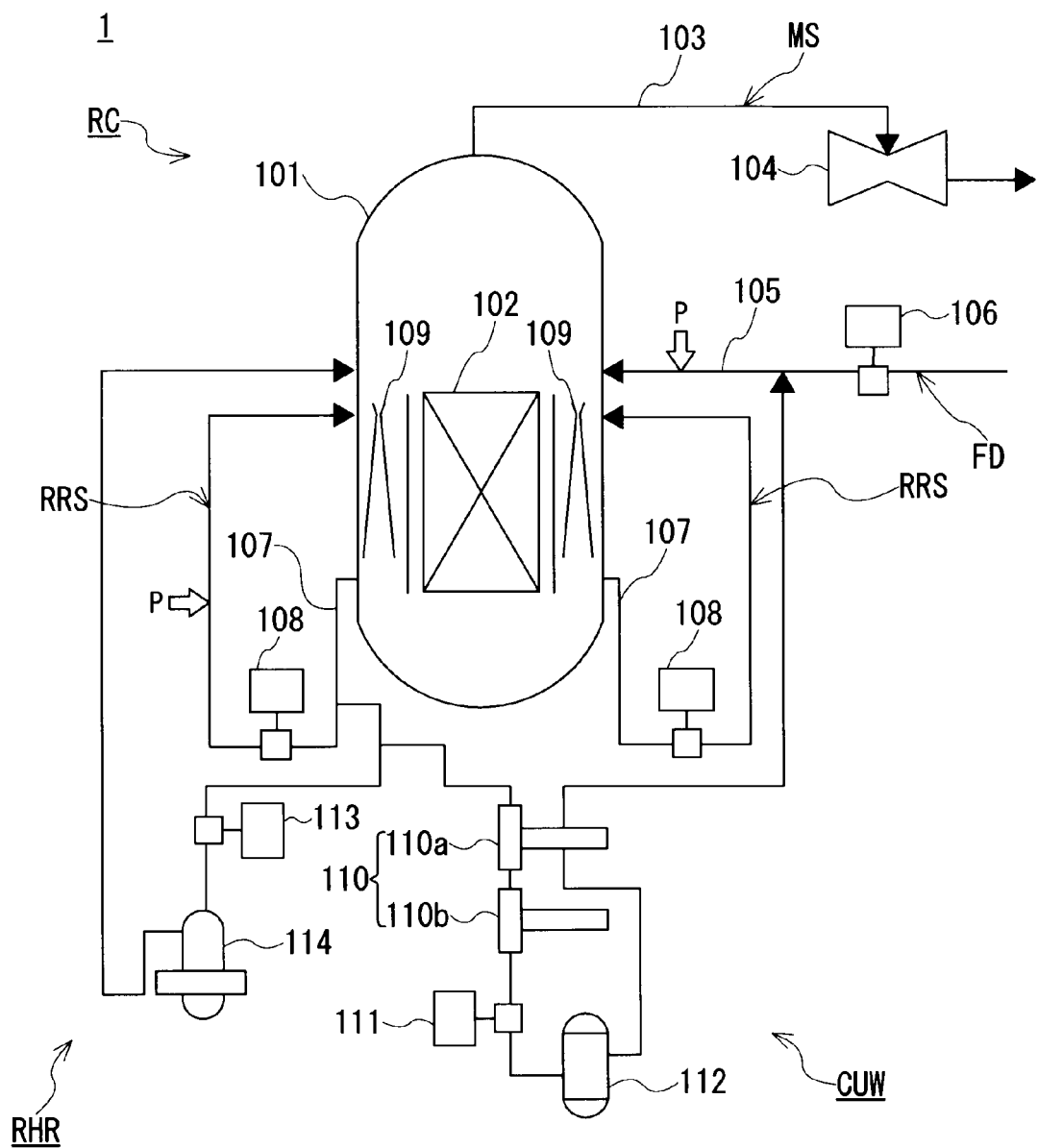
FIG. 1 is a configuration view schematically illustrating a reactor cooling system of a BWR power plant applied to the radiation exposure reduction method in the embodiment.

In the Figs (especially, in FIG. 1), the reference characters RC, MS, FD, RRS, CUW, RHR and P respectively denote the reactor cooling system, the main steam system, the feed water system, the reactor recirculation system, the reactor water clean-up system, the residual heat removal system and the point where iron injected.

DESCRIPTION OF PREFERRED
EMBODIMENTS OF THE INVENTION

Hereinafter, on the basis of examples applied to the reactor cooling system of the boiling water reactor (hereinafter, which will be referred to as "BWR"), embodiments of the radiation exposure reduction method according to the present invention will be described with reference to the accompanying drawings.

First Embodiment

FIG. 1 is a configuration view schematically illustrating a BWR power plant applied to the radiation exposure reduction method in a first embodiment. Incidentally, in FIG. 1, reactor structure, reactor cooling system RC, reactor water clean-up system CUW and residual heat removal system RHR of the BWR are illustrated.

In the reactor cooling system RC of BWR 1, a coolant (water) heated by a reactor core 102 in a reactor pressure vessel 101 is sent as high temperature and pressure steam to main steam pipes 103 of the main steam system MS and used for driving (rotating) a turbine 104 which is a drive source of a power generator. Incidentally, the steam emitted from the turbine 104 is reserved as condensate water and removed impurities for the purpose of corrosion of devices or pipes, tubes or the like included in the reactor cooling system RC. After the condensate water is warmed to specified temperature so as to be capable of supplying to the reactor vessel 101 as the coolant, the condensate water is again supplied to the reactor pressure vessel 101 through a feed water pipe 105 of the feed water system FD. A reference numeral 106 illustrated in FIG. 1 denotes a feed water pump.

Further, in the reactor recirculation system RRS, after the coolant in the reactor pressure vessel 101 is introduced into the recirculation system pipe 107 and pressurized by the recirculation pump 108, the coolant is injected and supplied from the jet pump 109 to the reactor pressure vessel 101. By adjusting output of the recirculation pump 108, the reactor core output control is performed by the coolant supply quantity control and the coolant is stirred in the reactor pressure vessel 101.

In the reactor water clean-up system CUW, after the heat exchanger 110 (regenerative heat exchanger 110a, non-regenerative heat exchanger 110b) cools down one branch of the coolant introduced into the recirculation system pipe 107 at a temperature which is proper temperature for filtration and demineralization, the coolant is pressurized by the pump 111 and thereby impurities in the coolant is removed by the filtration and demineralization device 112. The coolant performed by the clean-up process is cooled down and then supplied into the reactor pressure vessel 101 through the feed water pipe 105 in the feed water system FD. Further, in the residual heat removal system RHR, other branches of the coolant is pressurized by the pump 113 and cooled down by the heat exchanger 114 to a predetermined temperature.

The stainless steel or the nickel base alloy, which has excellent mechanical strength and corrosive-resistant even under high temperature and pressure is used as material of devices or pipes contacting with high temperature and pressure coolant which flows in the reactor cooling system RC. However, even with the use of the stainless steel or the nickel base alloy, because the stainless steel or the nickel base alloy is not unrelated to corrosion reaction, oxide film is produced on the surface of the stainless steel or the nickel base alloy and crud (metal oxide) or ionic impurity including particulate nickel nuclides can be carried into the coolant.

The material included in the coolant such as crud, ionic impurity or the like is collectively called "corrosion product", and finally carried into the reactor core 102 through the reactor cooling system RC, the reactor water clean-up system CUW and the residual heat removal system RHR. The corrosion products carried into the reactor core 102 are radioactivated by the neutron irradiation on the reactor core 102, particularly, on the surface of fuel cladding tube and thereby changed into radioactive corrosion product. For example, nickel 58 ($^{58}$Ni) or cobalt 59 ($^{59}$Co) contained in corrosion product radioactivates into cobalt 58 ($^{58}$Co) or cobalt 60 ($^{60}$Co) irradiating high energy gamma ray. Incidentally, a radioactive corrosion product is also generated by falling away or eluting metal materials of the core internal structure which is radioactivated.

The radioactive corrosion product including radioactive isotope of cobalt produced by performing various processes circulates in the reactor cooling system RC along the coolant flow in particle or ionic state. Although a part of the radioactive corrosion product is again adhered and fixed on the surface of fuel cladding tube or removed in the filtration and demineralization device 112 of the reactor water clean-up system CWU or other clean-up device, the other part of the radioactive corrosion product is adhered on inner surface of devices or pipes included in the reactor cooling system RC and thereby increases the radiation dose (amount of radiation)

around the reactor cooling system RC. The radiation exposure reduction method in the embodiment is used for the purpose of reducing radiation dose around the reactor cooling system RC.

The radiation exposure reduction method in the embodiment is a method suppressing the radiation dose around the reactor cooling system RC by injecting iron into the coolant which flows from the reactor cooling system RC to the reactor core 102 in the BWR 1 and ferritizing and fixing radionuclides or parent nuclides thereof, which are contained in the coolant, on the surface of the reactor core 102, particularly the surface of the fuel rod. The radiation exposure reduction method in the embodiment includes four procedures 1-4 (random order) as follows.

Procedure 1: Prepare a tank in which water solution of the iron citrate (soluble organic iron) is accumulated and a high-pressure injection pump capable of injecting the iron citrate solution into the reactor cooling system RC which is high-pressure.

Procedure 2: A point where the iron citrate solution is injected is set at the recirculation system pipe 107 of the reactor cooling system RC or a discharge side of the feed water pump 106 installed in the feed water pipe 105 of the reactor cooling system RC. The reference character P illustrated in FIG. 1 denotes the point where iron injected.

As the iron solved in the iron citrate solution is present as ion state, the iron solved in the ferric citrate solution has a high reactivity to other chemical species. Therefore, the nearer a distance (pipe length) from the iron injection point P to the reactor pressure vessel 101, the more preferable in view of reducing a loss for transporting iron ions to be transported to the reactor core 102. Further, the iron injection point P may be one or more.

Procedure 3: In a time that the coolant circulates, for example, in the plant operation, in the start operation or in the stop operation, iron injection from each injection point P is started.

Procedure 4: The quantity of iron in the coolant is controlled such that iron concentration in the coolant at the time of feeding feed water is approximately 0.05 to 0.5 ppb. The reason controlling the quantity of iron injected into the coolant is that if iron concentration in the coolant at the time of feeding feed water is approximately 0.05 to 0.5 ppb, an effect impacted on the plant property such as the electrical conductivity can be disregarded.

Next, the effect of the radiation exposure reduction method in the embodiment will be described with reference to the result of a verification test.

The verification test is performed for verifying chemical properties of the iron citrate regarding a controllability of iron concentration of the coolant, a generation speed of the nickel ferrite and the cobalt ferrite, and an adherability of each ferrite on fuel cladding tube. The verification test includes the solubility test, the reaction test and the adhesion test.

[Solubility Test]

The solubility test is a test for verifying the chemical properties of the iron citrate regarding the controllability of iron concentration of the coolant. The procedures (steps) of the solubility test will be described.

The step S101: Add the iron citrate into 500 ml pure water in the beaker such that the iron concentration of the solution is 150 ppm.

The step S102: Irradiate ultrasonic wave into the iron citrate solution in the beaker with stirring a spatula. The stirring operation, i.e., operation for evenly dispersing reagent is continued for 10 minutes. After the ultrasonic wave treatment, leave the beaker as it is.

The step S103: Respectively collect from suspension liquid at 10, 20, 30, 45 and 60 minutes after the ultrasonic wave treatment.

The step S104: Put a drop of the suspension liquid is dropped on the filter of which pore size is 0.1 μm and perform a decompression filtering operation (which denotes a operation filtering something under reduced pressure).

The step S105: Measure quantity of iron on the filter by utilizing an X-ray fluorescence spectrometer.

Figure 2:
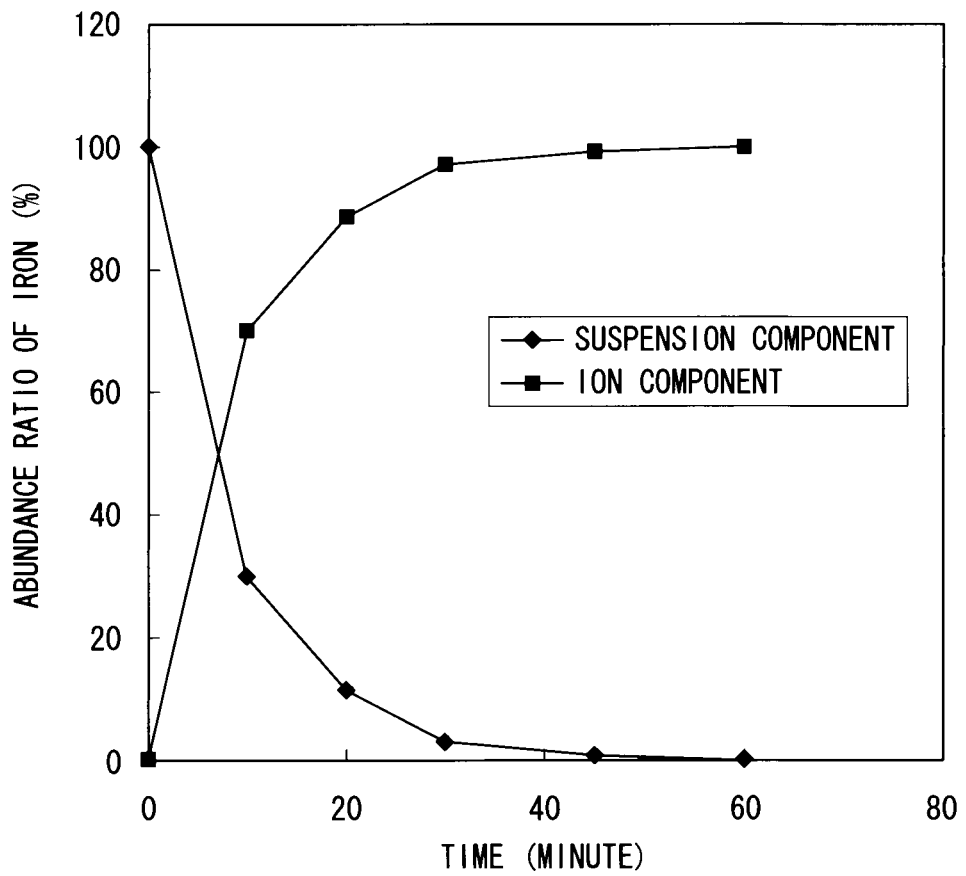
FIG. 2 is a graph representing a result of a verification test (solubility test) according to the radiation exposure reduction method in the embodiment.

FIG. 2 is a graph representing a result of a verification test (solubility test) according to the radiation exposure reduction method in the embodiment. In FIG. 2, the horizontal axis represents an elapsed time from the reference time (0 minute) immediately after the ultrasonic wave treatment in the step S102 starts. Further, the vertical axis represents the suspension component and the ion component of the total amount of iron (sum of the suspension component and the ion component).

As shown in FIG. 2, the iron which is a component of an iron citrate ionizes with the time and then finishes ionizing almost full after about 60 minutes from starting the ultrasonic wave procedure.

As a result, (a) The component iron of the iron citrate injected into the coolant is quickly (about within 60 minutes) and almost fully changed into iron ion and circulates in the reactor cooling system RC. Or, the component iron of the iron citrate injected into the coolant is quickly and almost fully changed into iron ion in the tank where the iron citrate solution is accumulated, after injecting the iron citrate solution into the coolant, and thereby circulates in the reactor cooling system RC. Thus, as the iron citrate has water solubility, i.e., high dispersibility, iron can be supplied to the coolant in the reactor cooling system RC in uniform flow and thereby iron concentration in the coolant can be easily controlled.

(b) As a result of using the iron citrate as the iron to be injected into the coolant, it becomes unnecessary to perform the electrolysis operation for the purpose of obtaining the iron ion. Hence, as in the case of utilizing the electrolysis operation, mechanical cleaning in order to remove oxide film generated on the surface of the electrodes or the like is unnecessary and thereby the workload for operating devices to inject iron ion can be reduced.

[Reaction Test]

The reaction test is a test for verifying the chemical properties of the iron citrate regarding the generation speed of the nickel ferrite and the cobalt ferrite. The procedures (steps) of the reaction test will be described.

The step S201: Prepare three kinds of iron reagents which are respectively the particulate iron reagent, the iron citrate reagent and the iron oxalate reagent and inject in the test tube (volume: 20 ml) made of Teflon (Registered Trademark) such that iron weight is 2.5 mg from each iron reagent.

The step S202: Add 15 ml pure water to each test tube and further add nickel sulfate solution such that the weight of nickel is 1.25 mg.

The step S203: Irradiate the ultrasonic wave into each test tube and evenly disperse solute in each test tube.

The step S204: Put each test tube into the autoclave and heat at 285° C. (degree) for about 17 hours. Herein, the heating temperature (285° C.) is set as a temperature which simulates coolant temperature in the reactor cooling system RC of the BWR 1.

The step S205: After the end of heating the test tube, filtrate reactant in each test tube with the filter of which pore size is 0.1 μm. Subsequently, measure a form of the reactant and a composition ratio of the reactant by utilizing an X-ray fluorescence spectrometer and X-ray diffractmeter.

Figure 3:
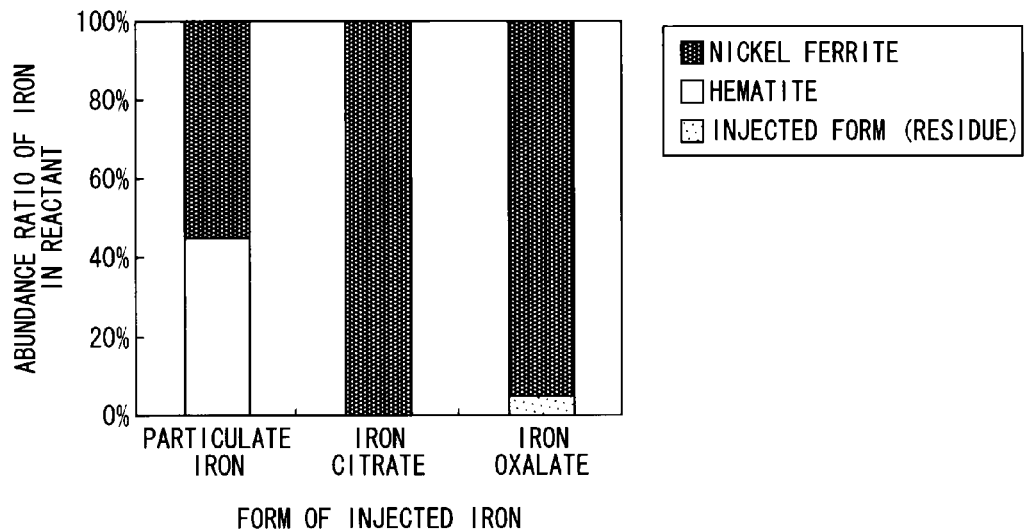
FIG. 3 is a graph representing a result of a verification test (reaction test) according to the radiation exposure reduction method in the embodiment.

FIG. 3 is a graph representing a result of a verification test (reaction test) according to the radiation exposure reduction method in the embodiment.

As shown in FIG. 3, the abundance form of iron under a condition that the particulate iron reacts with the nickel sulfate is mostly composed of nickel ferrite ($NiFe_2O_4$) and hematite ($Fe_2O_3$). The abundance form of iron under a condition that the iron citrate reacts with the nickel sulfate is mostly composed of the nickel ferrite. Although the abundance form of iron under a condition that the oxalate iron reacts with nickel sulfate is mostly composed of the nickel ferrite, the iron oxalate in injection form is slightly (approximately 5%) remained.

That is, as the iron citrate has high reactivity to nickel, the nickel ferrite is easily produced in comparison to the particulate iron or the iron oxalate. Further, as the iron citrate has also high reactivity to cobalt which is similar to a chemical property of nickel, it seems that the cobalt ferrite is easily produced in comparison to the particulate iron or the iron oxalate.

As a result, (c) By injecting iron citrate into the coolant, nickel and cobalt can be well ferritized in comparison to a case where a particle iron or an iron oxalate is injected into the coolant.

[Adhesion Test]

The adhesion test is a test for verifying chemical properties of the iron citrate regarding an adherability of the nickel ferrite or the cobalt ferrite on the fuel cladding tube. The procedure (steps) of the adhesion test will be described below.

The step S301: Prepare two kinds of iron reagents which are respectively the particulate iron reagent and the iron citrate reagent and produce solution of which the iron concentration is 100 ppb and the nickel ion concentration is 10 ppb for each iron reagent.

The step S302: Flow each solution produced at the step S301 through test equipment which simulates boiling environment in the fuel cladding tube and therearound of BWR1. The flow rate of each solution produced at the step S301 through test equipment is 250 ml/min and the time for running each solution produced at the step S301 is about 100 hours. The test equipment is configured such that a test piece (a tube composed of zircaloy having outside diameter of about 12 mm and length of about 200 mm) which simulates fuel cladding tube is used, the sheath heater is covered with a test piece, a liquid supplied to the surface of test piece, and the injected liquid is superheated and boiled.

The step S303: Measure the adhesion quantity of nickel adhered on the surface of the test piece in completion of solution flow in the step S302.

Figure 4:
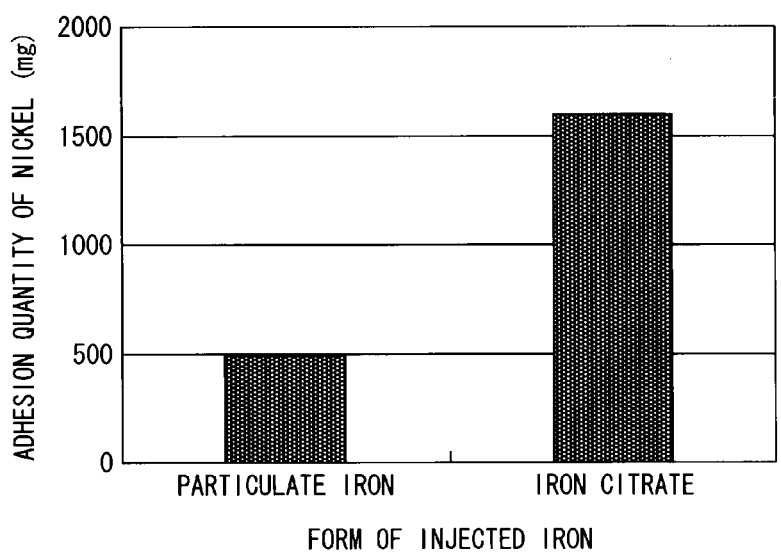
FIG. 4 is a graph representing a result of a verification test (adhesion test) according to the radiation exposure reduction method in the embodiment.

FIG. 4 is a graph representing a result of a verification test (adhesion test) according to the radiation exposure reduction method in the embodiment.

As shown in FIG. 4, in case where the particulate iron solution is passed through the test equipment, the quantity of nickel adhered on the surface of the test piece is 490 mg. Further, in case where the iron citrate solution is passed through the test equipment, the quantity of nickel adhered on the surface of the test piece is 1600 mg. That is, the iron citrate allows nickel to easily fix on the test piece in comparison to the particulate iron. Further, as the iron citrate has also high reactivity to cobalt which is similar to a chemical property of nickel, it seems that the iron citrate also allows cobalt which is similar to a chemical property of nickel to easily fix on the test piece in comparison to the particulate iron.

As a result, (d) By injecting iron citrate into the coolant, nickel or cobalt can be easily fixed on the surface of the fuel cladding tube in comparison to a case where a particle iron or an iron oxalate is injected into the coolant. In addition, the nickel adhesion quantity in the case where iron citrate is injected into the coolant is about three times larger than the nickel adhesion quantity in the case where particle iron is injected into the coolant.

As is obvious from the content above-described, according to the radiation exposure reduction method in the first embodiment, (1) In case where the coolant circulates such case as a plant in operation and so on, the iron citrate is used as iron to be injected into the coolant. Nickel and cobalt can be well ferritized and then fixed on the surface of the fuel cladding tube by acts of iron injected into the coolant. Moreover, the control of the iron concentration in the coolant becomes easy and the workload for handling the device used upon injecting iron into the coolant can be reduced.

(2) Moreover, the point where the iron citrate solution is injected into the coolant is set at the recirculation system pipe 107 of the reactor cooling system RC or a discharge side of the feed water pump 106 installed in the feed water pipe 105 of the reactor cooling system RC. That is, the point where the iron citrate solution is injected is set at the nearer point from the reactor pressure vessel 101. Thus, excess iron injection in consideration of decreasing quantity by adhering on devices or pipes included in the reactor cooling system RC before the iron citrate which has high reactivity reaches to the reactor core 102 can be suppressed and an influence of plant operation can be reduced.

Second Embodiment

The second embodiment is configured as the same conditions as in the first embodiment except that the iron reagent used in the procedures 1-4 of the radiation exposure reduction method in the second embodiment is changed to iron reagent different from the iron reagent used in the procedures 1-4 of the radiation exposure reduction method in the first embodiment.

In the radiation exposure reduction method in the second embodiment, a suspension produced by adding iron oxalate which has a particle diameter of 1-3 μm to pure water is used as iron injecting into the reactor cooling system RC of BWR 1. Herein, the iron oxalate has poor solubility with respect to the coolant in comparison to the iron citrate. Incidentally, as other points substantially equal to those of the first embodiment, their explanation will be omitted.

Next, the effect of the radiation exposure reduction method in the embodiment will be described with reference to the result of a verification test (dispersion test).

[Dispersion Test]

The dispersion test is a test for verifying properties, of the iron oxalate which has low solubility to the water (coolant), regarding a controllability of the iron concentration in the coolant. The procedure (steps) of the dispersion test will be described below.

The step S401: Prepare two kinds of iron reagents which are respectively the reagent of commercially available iron oxalate and the reagent of iron oxalate having small particle diameter and produce suspension liquid of each iron reagent in the beaker. Herein, the particulate diameter of most commercially available iron oxalate is several tens of micrometer (μm) and the particle diameter of most iron oxalate having small particle diameter is 1-3 μm.

The step S402: Irradiate ultrasonic wave into the suspension liquid in the beaker with stirring a medical spoon in the beaker. The stirring operation, i.e., operation for evenly dispersing reagent is continued for 10 minutes. After the ultrasonic wave treatment, leave the beaker as it is.

The step S403: Respectively check the residual rate in liquid of the iron oxalate in the suspension liquid of each beaker at 10, 20, 30, 45 and 60 minutes after the ultrasonic wave treatment.

Figures 5, 6:
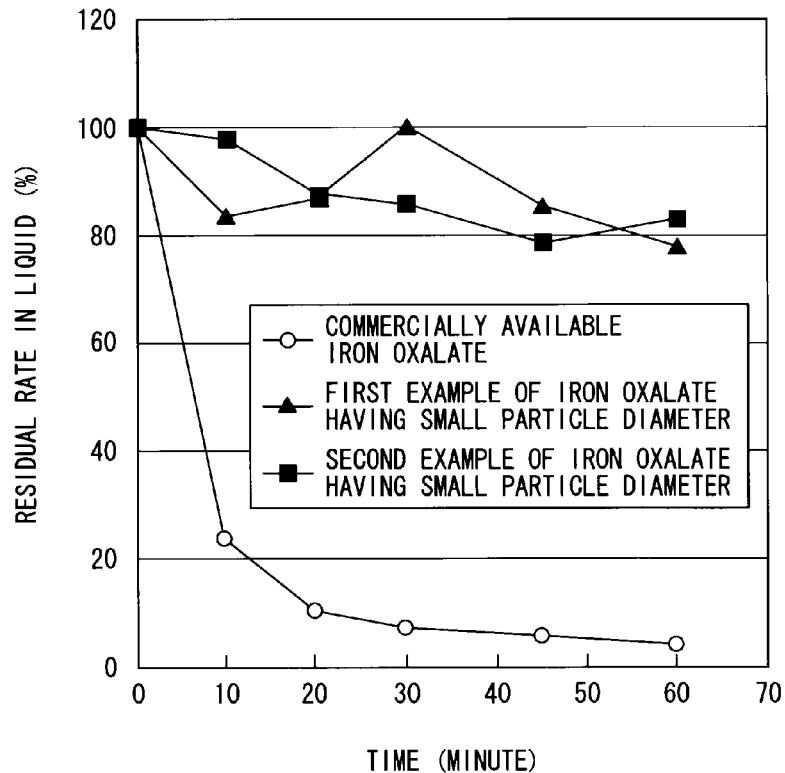
FIG. 5 is a graph representing a result of a verification test (dispersion test) according to the radiation exposure reduction method in the embodiment.
FIG. 6 is a table representing a result of a verification test (reaction test) according to the radiation exposure reduction method in the embodiment.

FIG. 5 is a graph representing a result of a verification test (dispersion test) according to the radiation exposure reduction method in the embodiment.

In FIG. 5, the horizontal axis represents an elapsed time from the reference time (0 minute) immediately after the ultrasonic wave treatment in the step S403 starts. Further, the vertical axis represents the residual rate in liquid of the iron oxalate in the beaker. The residual rate in liquid is that a suspension component quantity (except sediment component quantity) of the total amount of the iron oxalate injected into the beaker. Incidentally, "first example of iron oxalate having small particle diameter" and "second example of iron oxalate having small particle diameter", illustrated in FIG. 5 are same test condition that is the particle diameter or other test condition.

As shown in FIG. 5, most of the commercially available iron oxalate (the particle diameter is tens of μm) precipitates at 60 minutes after the ultrasonic wave treatment. Meanwhile, as most of the iron oxalate having small particle diameter (the particle diameter is 1-3 μm) does not precipitate even at 60 minutes after the ultrasonic wave treatment, the residual rate in liquid of the iron oxalate is approximately 80% or more. That is, the iron oxalate of which particle diameter is 1-3 μm has much higher dispersible in comparison to the iron oxalate of which particle diameter is tens of μm.

As a result, (e) if the iron oxalate (low solubility to the coolant) which has a particle diameter of 1-3 μm is used as iron to be injected into the coolant, as the iron oxalate has high dispersibility, the iron oxalate is suspended in the coolant, is maintained a state suspended in the coolant for the long term, and thereby circulates in the reactor cooling system RC in the suspended state. Thus, iron can be supplied to the coolant in the reactor cooling system RC in uniform flow and thereby iron concentration in the coolant can be easily controlled. Incidentally, methods for reducing the particle diameter of iron composite are that a method for suppressing particle growth by being high material concentration upon generating the iron oxalate, a method for physically crashing the commercially available iron oxalate, and so on.

(f) if the iron oxalate is used as iron to be injected into the coolant, as is the case with using the electrolysis operation, works (operations) such as the mechanical cleaning in order to remove oxide film generated on the surface of the electrodes are unnecessary. Moreover, as the iron oxalate has high dispersibility, the workload for operation of stirring the iron oxalate accumulated in the tank can be reduced.

(g) If the iron oxalate is injected into the coolant, as is the case for injecting particulate iron into the coolant, nickel can be well ferritized (see FIG. 3). Moreover, in the same manner, cobalt which is similar to a chemical property of nickel also can be well ferritized.

(h) The iron oxalate has low solubility to the water (coolant) and therefore become mostly particulate suspension component. Thus, if the iron oxalate is injected into the coolant, a loss for transporting iron ions to be transported to the reactor core 102 can be reduced in comparison to the case of injecting the iron citrate.

As is obvious from the content above-described, according to the radiation exposure reduction method in the second embodiment, (3) In case where the coolant circulates such case as a plant in operation and so on, an iron oxalate which has a particle diameter of 3 μm or less is used as the iron injected into the coolant. Therefore, nickel or cobalt can be well ferritized and then fixed on the surface of the fuel cladding tube by acts of iron injected into the coolant. Moreover, the control of the iron concentration in the coolant becomes easy and the workload for handling the device used upon injecting iron into the coolant can be reduced.

Third Embodiment

The third embodiment is configured as the same conditions as in the first embodiment except that the iron reagent used in the procedures 1-4 of the radiation exposure reduction method in the third embodiment is changed to iron reagent different from the iron reagent used in the procedures 1-4 of the radiation exposure reduction method in the first embodiment.

In the radiation exposure reduction method in the third embodiment, a suspension produced by adding a regent (which will be referred to as "mixture iron reagent", hereinafter) produced by mixing the iron citrate and an iron oxyhydroxide (FeO(OH)) to pure water is used as iron injecting into the reactor cooling system RC of BWR 1. Incidentally, as other points substantially equal to those of the first embodiment, their explanation will be omitted.

Next, the effect of the radiation exposure reduction method in the embodiment will be described with reference to the result of a verification test (reaction test).

[Reaction Test]

The reaction test is a test for verifying chemical properties of the iron oxyhydroxide reagent regarding the generation speed of nickel ferrite or cobalt ferrite. Herein, the reaction test for the iron oxyhydroxide is the same case as the reaction test (steps S201 to S205) described in the first embodiment.

The reaction test for the iron oxyhydroxide which is a component of the mixture iron reagent is performed by injecting some quantity of nickel into the suspension produced by adding the iron oxyhydroxide into pure water and then analyzing reactant thereof.

FIG. 6 is a table representing a result of a verification test (reaction test) according to the radiation exposure reduction method in the embodiment. In FIG. 6, "BEFORE REACTION TEST" represents the abundance ratio of the suspension and nickel before reaction test starts, and "REACTION TEST RESULT 1" and "REACTION TEST RESULT 2" respectively represent two experimental results obtained by performing reaction test under same conditions twice. Herein, "REACTION TEST RESULT 1" represents the abundance ratio of the reactant at first component analysis and "REACTION TEST RESULT 2" represents the abundance ratio of the reactant at second component analysis. Incidentally, both the first component analysis and the second component analysis are performed after 17 hours from the time when iron oxyhydroxide and nickel start to react.

As shown FIG. 6, in first component analysis, by the reaction of iron oxyhydroxide and nickel, 37% of total amount is remained as the iron oxyhydroxidet, 30% of total amount is produced as nickel ferrite, 34% of total amount is produced as hematite. In second component analysis, by the reaction of iron oxyhydroxide and nickel, 14% of total amount is remained as the iron oxyhydroxide which is material of the mixture iron reagent, 52% of total amount is produced as nickel ferrite, 34% of total amount is produced as hematite.

As the residual iron oxyhydroxide also reacts with nickel, nickel ferrite or hematite is gradually produced. Further, the hematite produced by the reaction reacts with the nickel and thereby the nickel ferrite is mildly produced. That is, although the reactivity which ferritizes nickel, of the iron oxyhydroxide has low in comparison to the iron citrate, the iron oxyhydroxide as a reagent (medical agent) of ferritization has long life. Incidentally, it seems that the iron oxyhydroxide also reacts with cobalt which is similar to a chemical property of nickel, by similar reaction process, and the iron oxyhydroxide as a reagent of ferritization has long life.

Herein, as the reactivity to iron citrate and nickel is good (see FIG. 3), the reactivity to iron citrate and cobalt is also considered to be good in a similar case of the reactivity to iron citrate and nickel. Thus, if iron citrate is injected into the coolant, nickel (cobalt) can be well ferritized. However, as the reactivity to iron citrate and nickel is high, the iron concentration of the coolant rapidly reduces and thereby does not long continue the ferritization of nickel (cobalt). That is, that iron citrate is injected into the coolant has bad side that a continuousness of the function (reaction) of the ferritization of nickel (cobalt) is not good.

Meanwhile, as the iron oxyhydroxide is also infusible, the reactivity to iron oxyhydroxide and nickel is not as high as the reactivity to iron citrate and nickel. Thus, under a condition that nickel presents in the mixture iron reagent, while the iron citrate is mostly consumed by producing the nickel ferrite within about 60 minutes (see FIG. 3), the iron oxyhydroxide remains tens of % of total amount even 17 hours later (see FIG. 6).

As a result, (i) if the mixture iron reagent produced by mixing the iron citrate and an iron oxyhydroxide (FeO(OH)) is injected into the coolant, nickel or cobalt can be well ferritized by the iron citrate injected into the coolant and the ferritizing operation (function) of nickel or cobalt can be continued for a longer time by the iron oxyhydroxide injected into the coolant.

As is obvious from the content above-described, according to the radiation exposure reduction method in the third embodiment.

(4) as iron to be injected into the coolant, if the iron oxyhydroxide is used with the iron citrate, nickel or cobalt can be well ferritized and then fixed on the surface of the fuel cladding tube by acts of iron injected into the coolant. Further, the control of the iron concentration in the coolant becomes easy and the workload for handling the device used upon injecting iron into the coolant can be reduced. Moreover, the ferritizing operation (function) of nickel or cobalt can be continued for a longer time.

While the embodiments of the radiation exposure reduction method according to the present invention are described in accordance with the first through third embodiment, the present invention are not limited to the method described in each embodiment. Further, various design changes, additions, omissions, submissions or the like in the form of the methods described herein may be made without departing from the scope of the inventions.

For example, although the iron citrate used as the example of iron injected into the coolant is explained in the first embodiment, the iron injected into the coolant may be organic iron which is soluble to water (coolant).

While the iron oxalate having particle diameter of 1-3 μm is explained in the second embodiment used as an example of the iron oxalate injected into the coolant, it is more preferable that the diameter (for example, 1 μm or less) of the iron oxalate injected into the coolant becomes as small as possible. The reason mentioned above is that the smaller the diameter of the iron oxalate is, the more the dispersibility in liquid increases and thereby the controllability of iron concentration of the coolant can be improved and the workload reduction for operation of stirring the iron oxalate accumulated in the tank can be achieved. Incidentally, instead of the iron oxalate, organic iron such as iron fumarate or the like may be used as iron to be injected into the coolant.

While the mixture produced by mixing the iron citrate and the iron oxyhydroxide is explained in the third embodiment used as an example of iron injected into the coolant, the organic iron such as the iron oxalate, the iron fumarate or the like may be used as iron used with the iron oxyhydroxide. Moreover, another iron compound may be used in stead of the iron oxyhydroxide. In this regard, in view of ensuring the continuousness of the function of the ferritization of nickel or the like, it is preferable that the higher dispersibility in water (coolant) of the iron compound is. Furthermore, it is preferable that the lower solubility in water (coolant) of the iron compound is.

Moreover, in the BWR power plant including the internal pump, the injection point of iron may be set at the reactor water clean-up system or the like instead of the reactor recirculation system.

The invention claimed is:

1. A radiation exposure reduction method comprising:
   injecting iron into a coolant as a feed water which flows from the reactor cooling system to the reactor core in a nuclear power plant in a plant operation to thereby ferritize and fix radionuclides or parent nuclides thereof, which are contained in the coolant, on the surface of a reactor core structure,
   wherein a soluble organic iron is used as the iron to be injected into the coolant,
   wherein a quantity of the iron to be injected into the coolant is controlled such that an iron concentration in the coolant at the time of feeding the feed water is 0.05 to 0.5 ppb, and
   wherein a point where the soluble organic iron is injected into the coolant is set at a reactor recirculation system or a discharge side of a feeder pump of a feed water system.

2. The radiation exposure reduction method according to claim 1, wherein an infusible iron compound is used with the soluble organic iron.

3. The radiation exposure reduction method according to claim 2, wherein an iron oxyhydroxide is used as the infusible iron compounds.

4. A radiation exposure reduction method comprising:
   injecting iron into a coolant as a feed water which flows from the reactor cooling system to the reactor core in a nuclear power plant in a plant operation to thereby ferritize and fix radionuclides or parent nuclides thereof, which are contained in the coolant, on the surface of a reactor core structure,
   wherein an organic iron which has a particle diameter of 3 μm or less, is used as the iron to be injected into the coolant,
   wherein an quantity of the iron to be injected into the coolant is controlled such that an iron concentration in the coolant at the time of feeding the feed water is 0.05 to 0.5 ppb, and
   wherein a point where injects the soluble organic iron into the coolant is set at a reactor recirculation system or a discharge side of a feeder pump of a feed water system.

5. The radiation exposure reduction method according to claim 4, wherein an infusible iron compound is used with the soluble organic iron.

6. The radiation exposure reduction method according to claim 5, wherein an iron oxyhydroxide is used as the infusible iron compounds.

* * * * *